(12) United States Patent
Uchiumi (10) Patent No.: US 11,372,601 B2
(45) Date of Patent: Jun. 28, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Yohei Uchiumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/995,766

(22) Filed: Aug. 17, 2020

(65) Prior Publication Data

US 2021/0286566 A1 Sep. 16, 2021

(30) Foreign Application Priority Data

Mar. 16, 2020 (JP) .............................. JP2020-044927

(51) Int. Cl.
*G06F 3/12* (2006.01)
(52) U.S. Cl.
CPC .......... *G06F 3/1208* (2013.01); *G06F 3/1255* (2013.01); *G06F 3/1256* (2013.01); *G06F 3/1204* (2013.01)

(58) Field of Classification Search
CPC .... G06F 3/1208; G06F 3/1256; G06F 3/1255; G06F 3/04842; G06F 3/1285; G06F 3/1204
USPC ......................................................... 358/1.14
See application file for complete search history.

(56) References Cited

U.S. PATENT DOCUMENTS

| 2010/0131566 | A1* | 5/2010 | Sato | ......................... G06F 40/10 707/802 |
| 2020/0007698 | A1* | 1/2020 | Ogawa | ............... H04N 1/00188 |
| 2020/0174718 | A1* | 6/2020 | Yamada | ................. G06F 3/1247 |

FOREIGN PATENT DOCUMENTS

| JP | 2007328516 | 12/2007 |
| JP | 2011-138532 | 7/2011 |
| JP | 2013-175199 | 9/2013 |
| JP | 5389072 | 1/2014 |
| JP | 5643866 | 12/2014 |

* cited by examiner

*Primary Examiner* — Darryl V Dottin
(74) *Attorney, Agent, or Firm* — JCIPRNET (57) ABSTRACT

An information processing apparatus includes a processor. The processor is configured to display an area in association with a setting of a print attribute. The processor is configured to display each page in the area for the print attribute which is set for the page. The pages form a document that is to be printed.

13 Claims, 13 Drawing Sheets

- DOUBLE-SIDED PRINTING (SINGLE-SIDED PRINTING, DOUBLE-SIDED PRINTING (LONG SIDE), DOUBLE-SIDED PRINTING (SHORT SIDE))
- Nup (NO Nup, 2up, 4up, 8up, 16up, 32up)
- COLOR PRINTING (BLACK-AND-WHITE, GRAY SCALE, SUBTRACTIVE COLOR, FULL COLOR)
- STAPLING (RIGHT SIDE, LEFT SIDE, UPPER SIDE, LOWER SIDE, UPPER RIGHT, UPPER LEFT, LOWER LEFT, LOWER RIGHT)
- PUNCHING (RIGHT SIDE, LEFT SIDE, UPPER SIDE, LOWER SIDE)
- FOLDING (BIFOLD, BIFOLD (MULTIPLE PAGES), OUTWARD TRI-FOLD, INWARD TRI-FOLD, Z-FOLD)
- STAMPING (CONFIDENTIAL, CIRCULAR, REFERENCE, URGENT, DO NOT COPY, HANDLE WITH CARE)
- OUTPUT SHEET SIZE (A4, A3, B5, POSTCARD, ...)

Setting in an incompatible state between print settings:

⦿ Make a print setting, which causes an incompatible state, unselectable

○ Use the print setting of the move destination preferentially when an incompatible state occurs ○ Use the print setting of the move target preferentially when an incompatible state occurs ○ Ask a user ☑ Preferentially use an automatically-preferable setting automatically

- SINGLE-SIDED PRINTING (NOT DOUBLE-SIDED PRINTING) < DOUBLE-SIDED PRINTING (LONG SIDE), DOUBLE-SIDED PRINTING (SHORT SIDE) (*1)
- NO Nup < 2up < 4up < 6up < 8up < … (*1)
- LAST PAGE WHICH IS REMAINDER DUE TO ODD NUMBER OF PAGES INCLUDED IN CHAPTER TO WHICH DOUBLE-SIDED PRINTING IS SET < ANOTHER INCOMPATIBLE SETTING (*2)
- REMAINING PAGES WHICH ARE REMAINDER OF PAGES OF CHAPTER TO WHICH Nup IS SET < ANOTHER INCOMPATIBLE SETTING (*2)
- SINGLE PAGE IN CHAPTER TO WHICH STAPLING IS SET < ANOTHER INCOMPATIBLE SETTING (*3)

(*1) ASSUME THAT SETTING OF NO DOUBLE-SIDED PRINTING IS DEFAULT SETTING. THE SAME IS TRUE FOR "NO Nup".
(*2) ALTHOUGH DOUBLE-SIDED PRINTING IS SET, IF PAGE COUNT IS ODD NUMBER, LAST PAGE MAY BE REGARDED AS NOT BEING SUBJECTED TO DOUBLE-SIDED PRINTING. THUS, SETTING OF DOUBLE-SIDED PRINTING IS NOTHING FOR THE PAGE, AND ANOTHER INCOMPATIBLE SETTING IS USED PREFERENTIALLY. ALTHOUGH Nup IS SET, IF THERE ARE REMAINING PAGES WHICH ARE REMAINDER, ANOTHER INCOMPATIBLE SETTING IS USED PREFERENTIALLY FOR SIMILAR REASON.
(*3) ALTHOUGH STAPLING IS SET, IF STAPLING RANGE IS ONLY ONE PAGE, USER IS HIGHLY LIKELY TO PERFORM ERRONEOUS OPERATION. THUS, ANOTHER INCOMPATIBLE SETTING IS USED PREFERENTIALLY FOR STAPLING SETTING.

FIG. 14

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-044927 filed Mar. 16, 2020.

BACKGROUND

(i) Technical Field

The present disclosure relates to an information processing apparatus and a non-transitory computer readable medium.

(ii) Related Art

In Japanese Patent No. 5643866, in the case where a document is formed of multiple chapters, print attributes may be set, not only for the entire document, but also for each chapter or each page. When a print attribute, which is set for a chapter, is different from that for the document, the setting for the chapter is used preferentially by overwriting the setting for the document with the setting for the chapter. In the case where a print attribute is set for a page, the print attribute setting for a page, which is different from those for the document and the chapter, is used preferentially by overwriting the settings for the document and the chapter with the setting for the page.

Other techniques of the related art are described in Japanese Patent No. 5389072 and Japanese Unexamined Patent Application Publication No. 2007-328516.

With reference to print attributes which are set for pages, a user may want to check the pages by partitioning the pages in accordance with the print attributes. However, in the related art, the print attributes, which are set for pages, are not capable of being checked systematically, that is, by partitioning the pages in accordance with the print attributes.

SUMMARY

Aspects of non-limiting embodiments of the present disclosure relate to a technique for, when print attributes are set for pages included in a document, facilitate a user's grasp of association between the pages and the print attributes, compared with the case in which the print attributes, which are set for the pages, are not displayed by using areas associated with the print attributes.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to display an area in association with a setting of a print attribute, and display each page in the area corresponding to the print attribute which is set for the page. The pages form a document that is to be printed.

BRIEF DESCRIPTION OF THE DRAWINGS

Exemplary embodiment of the present disclosure will be described in detail based on the following figures, wherein.

DETAILED DESCRIPTION

Desirable exemplary embodiment of the present disclosure will be described below on the basis of the drawings.

An information processing apparatus according to the present exemplary embodiment may be implemented by using a general-purpose hardware configuration such as a personal computer (PC) which has been used. That is, the information processing apparatus includes a central processing unit (CPU), a storage unit, including a read-only memory (ROM), a random-access memory (RAM), and a hard disk drive (HDD), a user interface unit, including an input unit, such as a mouse and a keyboard, and a display device provided as a display unit, and a network interface provided as a communication unit.

Figure 1:
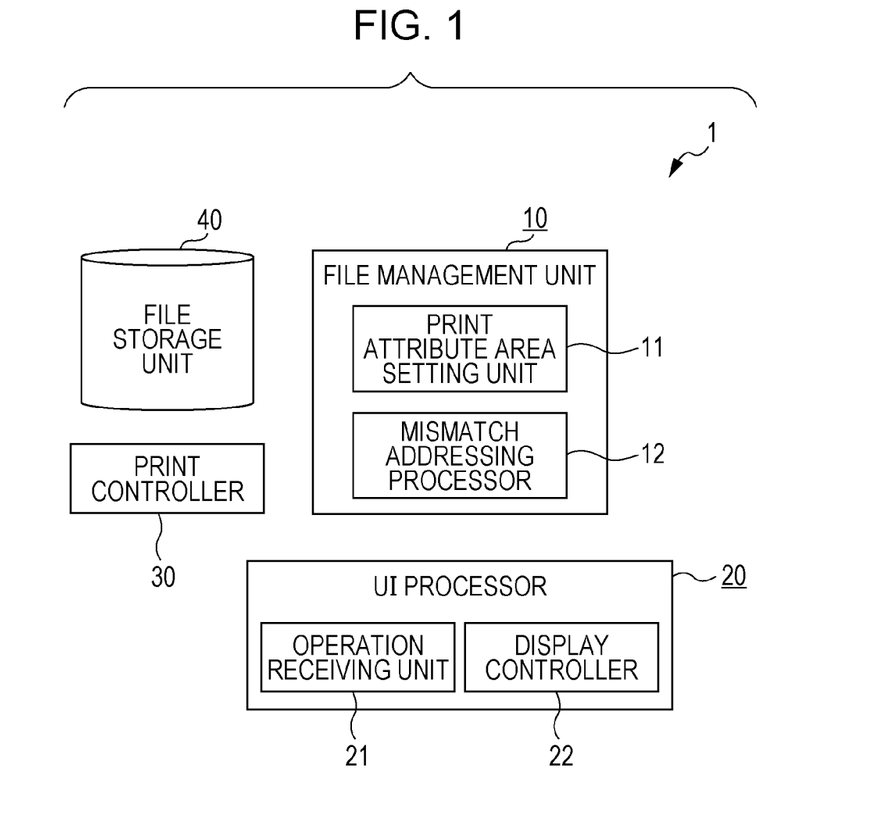
FIG. 1 is a block diagram illustrating the configuration of an information processing apparatus according to an exemplary embodiment of the present disclosure.

FIG. 1 is a block diagram illustrating the configuration of an information processing apparatus 1 according to an exemplary embodiment of the present disclosure. The information processing apparatus 1 according to the present exemplary embodiment includes a file management unit 10, a user interface (UI) processor 20, a print controller 30, and a file storage unit 40. Components, which are not used in the description about the present exemplary embodiment, are not illustrated in FIG. 1.

The file storage unit 40 stores files, each of which is formed of one or more pages. The file management unit 10 performs management, such as registration, change, and deletion of the files stored in the file storage unit 40. The file management unit 10 sets and changes print attributes of the files in accordance with instruction operations performed by users. The file management unit 10 includes a print attribute area setting unit 11 and a mismatch addressing processor 12. The print attribute area setting unit 11 sets, on a print view screen, an area for a print attribute in accordance with a given user operation on the displayed print view screen. The mismatch addressing processor 12 performs a mismatch addressing process which eliminates a mismatch between print attributes, for example, when, through a user operation, a print attribute, which is mutually exclusive against another print attribute, is set for a page, as described in detail below.

The user interface processor 20 includes an operation receiving unit 21 and a display controller 22. The operation receiving unit 21 receives user operations using a mouse, a keyboard, and the like. The display controller 22 controls display on a display device in accordance with an instruction from the file management unit 10. The print controller 30 controls execution of printing in accordance with print attributes which are set.

The components 10, 20, and 30 in the information processing apparatus 1 are implemented through collaborative operations between a computer, which forms the information processing apparatus 1, and programs operated by the CPU in the computer. The file storage unit 40 is implemented by using the HDD in the information processing apparatus 1. Alternatively, the file storage unit 40 may be implemented by using an external storage unit over a network.

The programs used in the present exemplary embodiment may be provided, not only by using a communication unit, but also by storing the programs in a computer-readable recording medium, such as a compact disc-read-only memory (CD-ROM) or a Universal Serial Bus (USB) memory. The programs, which are provided through the communication unit or the recording medium, are installed in the computer. The CPU of the computer executes the programs sequentially, thus implementing various processes.

The present exemplary embodiment is characterized by the following points: areas (hereinafter referred to as "print attribute areas") provided in association with print attributes are displayed on a screen; the pages included in a document that is to be printed are displayed in the respective print attribute areas for the print attributes which are set for the pages, thus enabling the pages to be displayed by being partitioned in accordance with their print attributes. To enable such display, in the present exemplary embodiment, a user interface for setting a print attribute for each page is provided. A print attribute setting process, which uses this user interface and which is characteristic in the present exemplary embodiment, will be described below by using the flowchart in FIG. 2.

Figure 2:
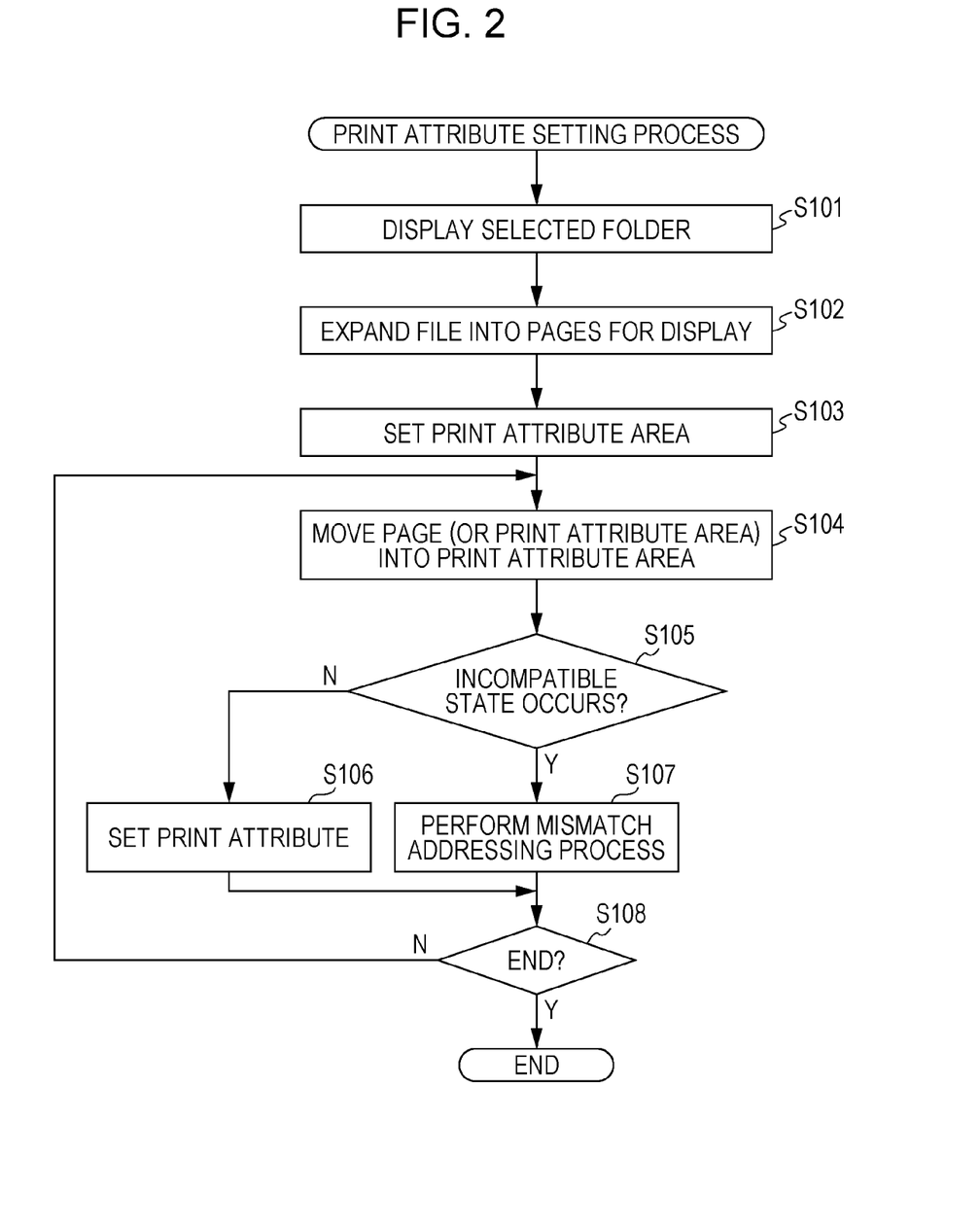
FIG. 2 is a flowchart of a print attribute setting process in the present exemplary embodiment.

A user uses a given file management application to select a folder including pages whose print attributes are to be set. When the operation receiving unit 21 receives the folder selection operation performed by the user, the file management unit 10 causes the display controller 22 to display, on a screen, the pages and the like stored in the specified folder (step 101).

Figure 3:
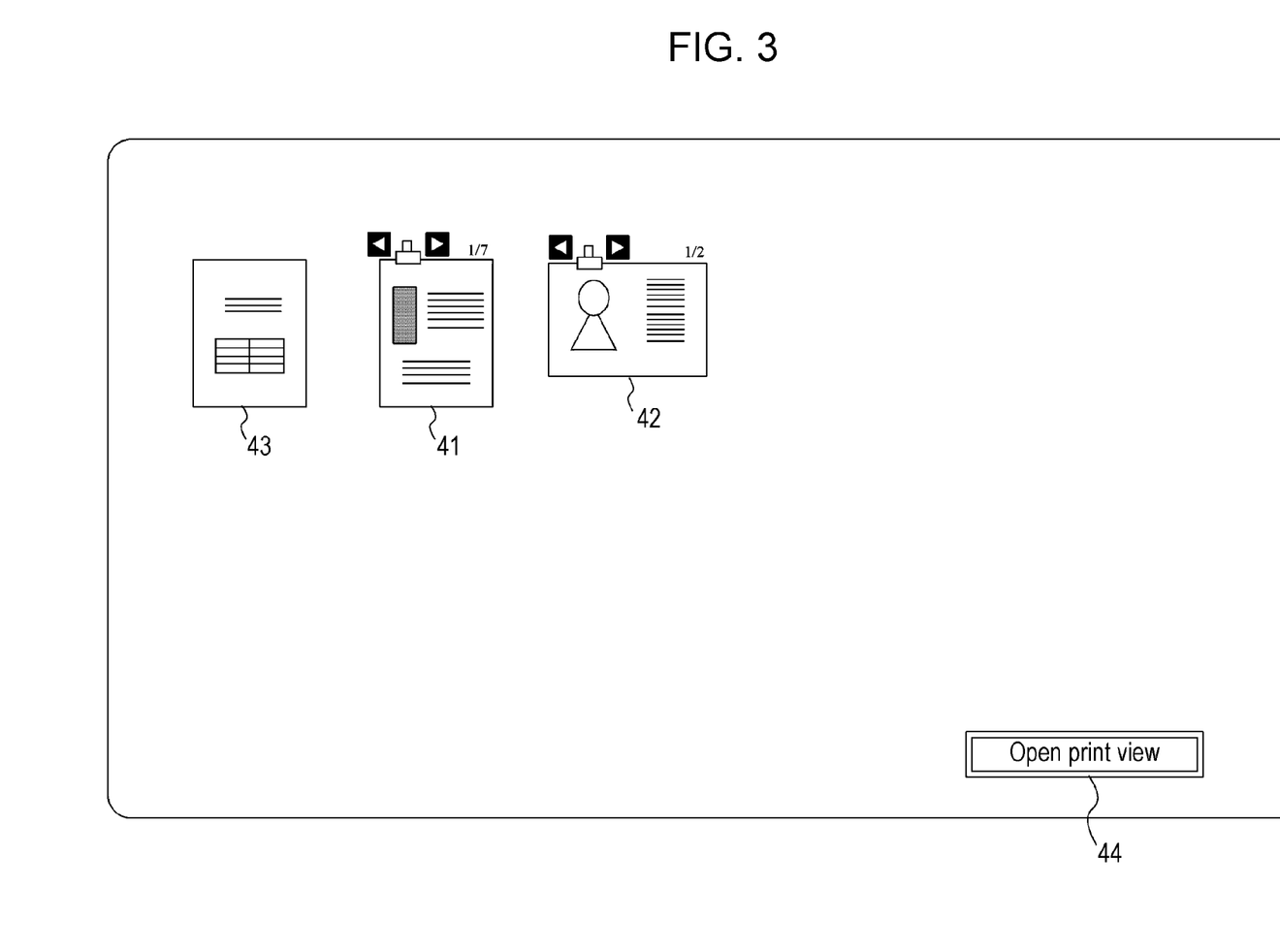
FIG. 3 is a diagram illustrating exemplary screen display of a page stored in a folder, in the present exemplary embodiment.

FIG. 3 is a diagram illustrating an exemplary screen displayed in accordance with the user operation. FIG. 3 illustrates reduced images (hereinafter referred to as "thumbnails") of files 41 and 42 and a page 43. A "page" 43 indicates a unit for forming a file. When a file is formed of a single page, that is, only one page, the thumbnail of the page 43 is displayed. "Files" 41 and 42 each include one or more pages 43. For the files 41 and 42, the thumbnails of pages typifying the files 41 and 42, for example, the thumbnails of the top pages, are selected for display. In the description below, for the sake of simplification of the description, when the thumbnails of the files 41 and 42 and the page 43 are indicated, the word, "thumbnail", may be omitted as appropriate, such as the files 41 and 42 and the page 43.

When the user selects an "Open print view" button 44 on the display screen in FIG. 3, the operation receiving unit 21 receives the selection operation of selecting the "Open print view" button 44. The file management unit 10 retrieves, from the file storage unit 40, information about the pages stored in the folder, and causes the display controller 22 to display the retrieved information on a screen (step 102).

Figure 4:
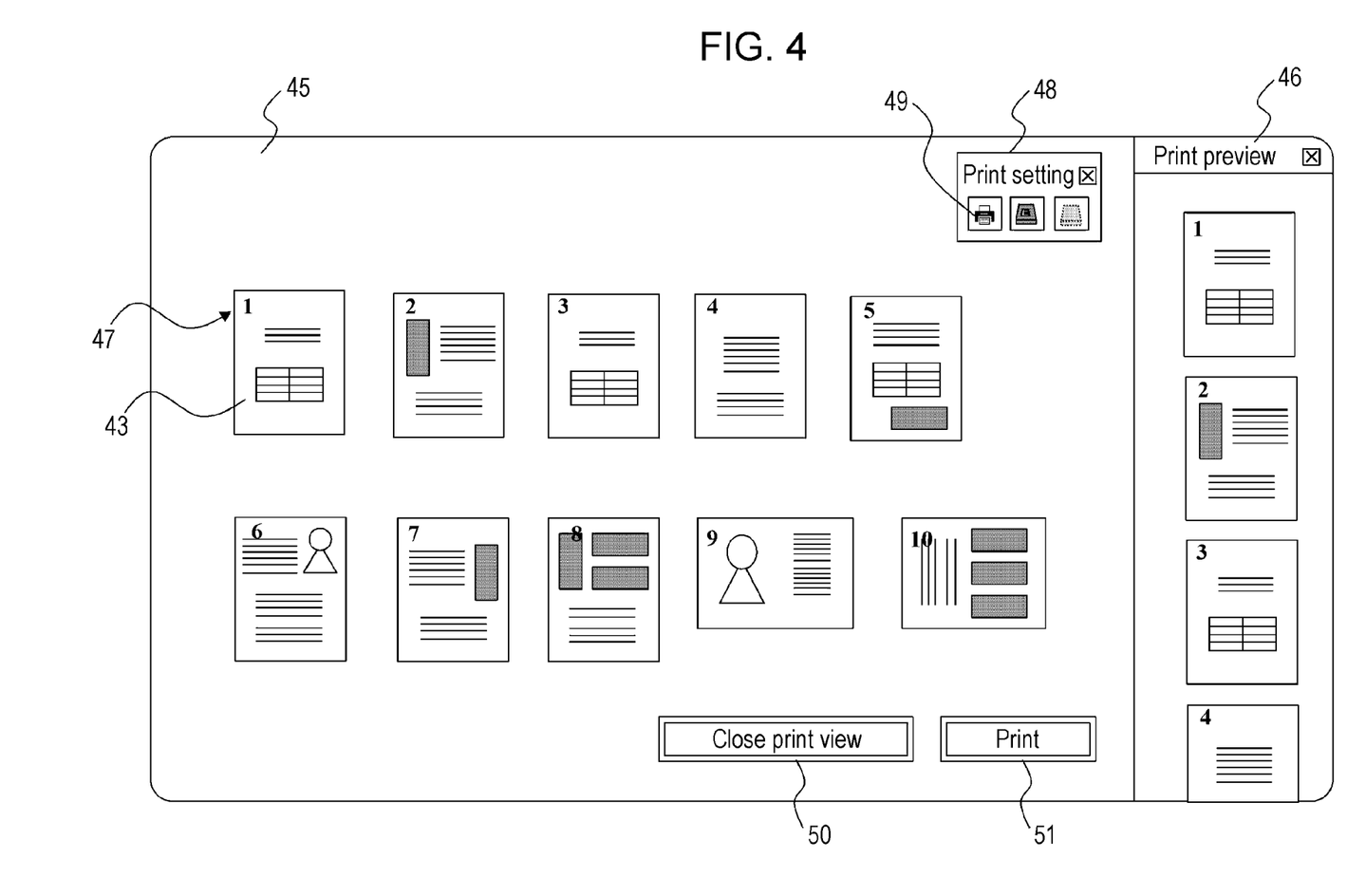
FIG. 4 is a diagram illustrating an exemplary display screen displayed when pages are deployed for display, in the present exemplary embodiment.

FIG. 4 is a diagram illustrating an exemplary screen displayed when a user selects the "Open print view" button 44, in the present exemplary embodiment.

As illustrated in FIG. 4, when the "Open sprint view" button 44 is selected, a print view screen 45 and a print preview screen 46, which is located on the right side of the print view screen 45, are displayed side by side.

On the print view screen 45, the files 41 and 42 are expanded, and the pages 43 included in the files 41 and 42 are displayed as individual pages. Each page 43 is given a print page number 47. FIG. 4 illustrates an example in which a print page number 47 is displayed near the left corner of each page 43. The print page numbers 47 are serial numbers of the pages 43 stored in the folder, and correspond to the order of printing which is used when all the pages 43 stored in the folder are printed. On the print preview screen 46, the image of the printed matter obtained by printing the pages 43 is displayed in the order of printing according to the current settings illustrated in the print view screen 45.

A print setting tool bar 48 is displayed at the top-right of the print view screen 45. In the print setting tool bar 48, icons 49 as reduced images corresponding to print attributes are displayed. In FIG. 4, for convenience sake, icons as display components for three types of print attribute are displayed. However, the types and the number of print attributes are not limited to this example. The configuration of print attributes 49 that are to be displayed may be changed as appropriate. In the description below, an icon 49 for a print attribute is abbreviated as a "print attribute 49" by omitting the word, "icon", as appropriate.

Figure 5:
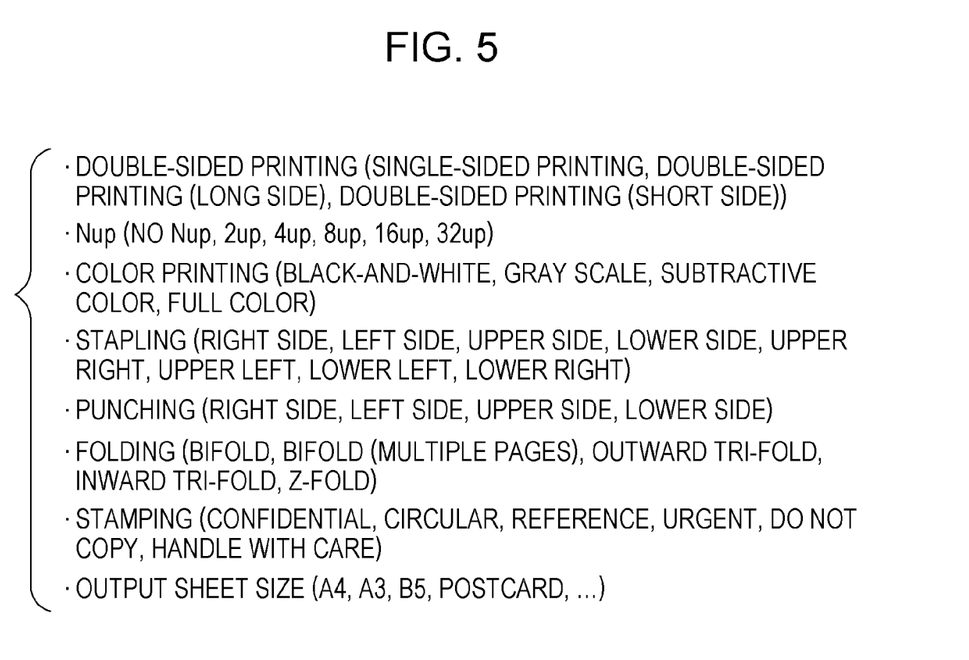
FIG. 5 is a diagram illustrating an example of print attribute items and the attribute values of the attribute items.

FIG. 5 is a diagram illustrating an example of print attribute items and the setting values of each item. As a print attribute 49, any of the print attributes in FIG. 5 is selected for display.

On the display screen in FIG. 4, when a "Close print view" button 50 is selected, the display returns to the display screen in FIG. 3. When a "Print" button 51 is selected, the pages 43 are printed in the order, which is displayed on the print preview screen 46, according to a print image which may be confirmed on the print preview screen 46.

Figure 6:
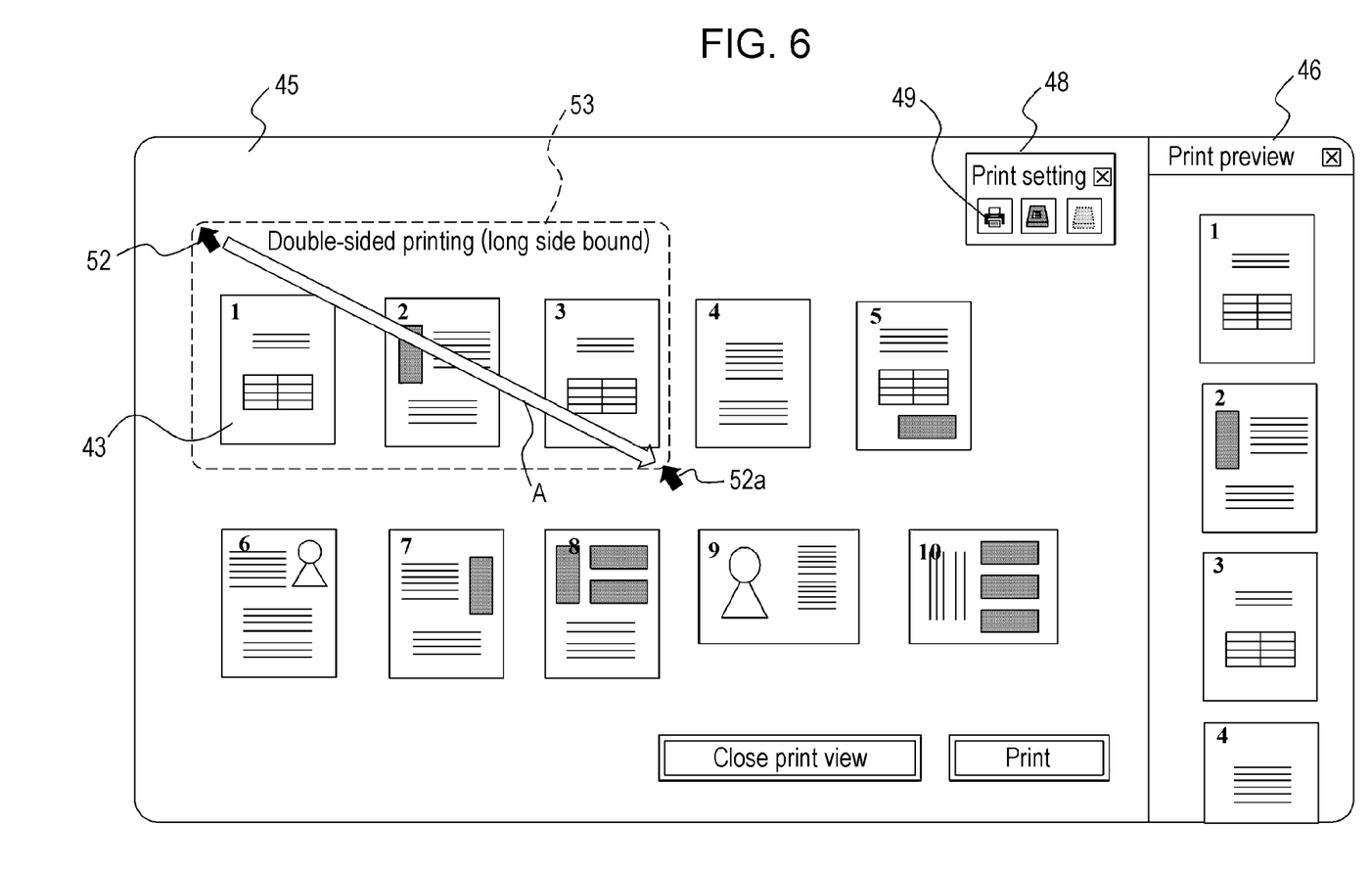
FIG. 6 is a diagram for describing a method of setting a print attribute area on the print view screen illustrated in FIG. 4.

In the present exemplary embodiment, a print attribute is set for pages 43 on the print view screen 45. That is, a user selects a print attribute 49, which is to be set, from the print setting tool bar 48. Then, the user specifies an area by moving a mouse cursor 52 to the position of a mouse cursor 52a as illustrated by using arrow A while dragging the mouse cursor 52 as illustrated in FIG. 6. In accordance with the user operation, the print attribute area setting unit 11 sets a print attribute area 53 for a print attribute 49 (in the example in FIG. 6, the "Double-sided printing (long side bound)") selected from the print setting tool bar (step 103). The display controller 22 displays, on the screen, the print attribute area 53 which has been set. In the present exemplary embodiment, a print attribute area is illustrated by using a dashed line. The file management unit 10 sets, through the user operation, the print attribute of double-sided printing (long side bound) for the pages whose print page numbers are 1 to 3. Thus, in the present exemplary embodiment, a print attribute may be set for multiple pages 43 collectively.

The size of a print attribute area may be adjusted after setting of the print attribute area. If the number of included pages 43 increases, a user performs an operation so that the size of the print attribute area increases. Thus, the user may adjust the display so that the pages are not displayed in an overlapping manner in the print attribute area. As a matter of course, when the number of pages decreases, an adjustment may be made so that the size of the print attribute area decreases.

The user selects a print attribute 49, which is different from that selected before, from the print setting tool bar 48. Then, the user specifies an area through a mouse operation in a similar way described above. In accordance with the user operation, the print attribute area setting unit 11 sets a print attribute area for the print attribute 49 selected from the print setting tool bar 48. The display controller 22 displays, on the screen, the print attribute area which has been set. The file management unit 10 sets the print attribute, corresponding to the print attribute area, for the pages located in the print attribute area. In the present exemplary embodiment, a mouse operation, which is a simple operation, is used to select a print attribute 49 and set a print attribute area for the print attribute, enabling the print attribute to be set for pages 43.

Figure 7:
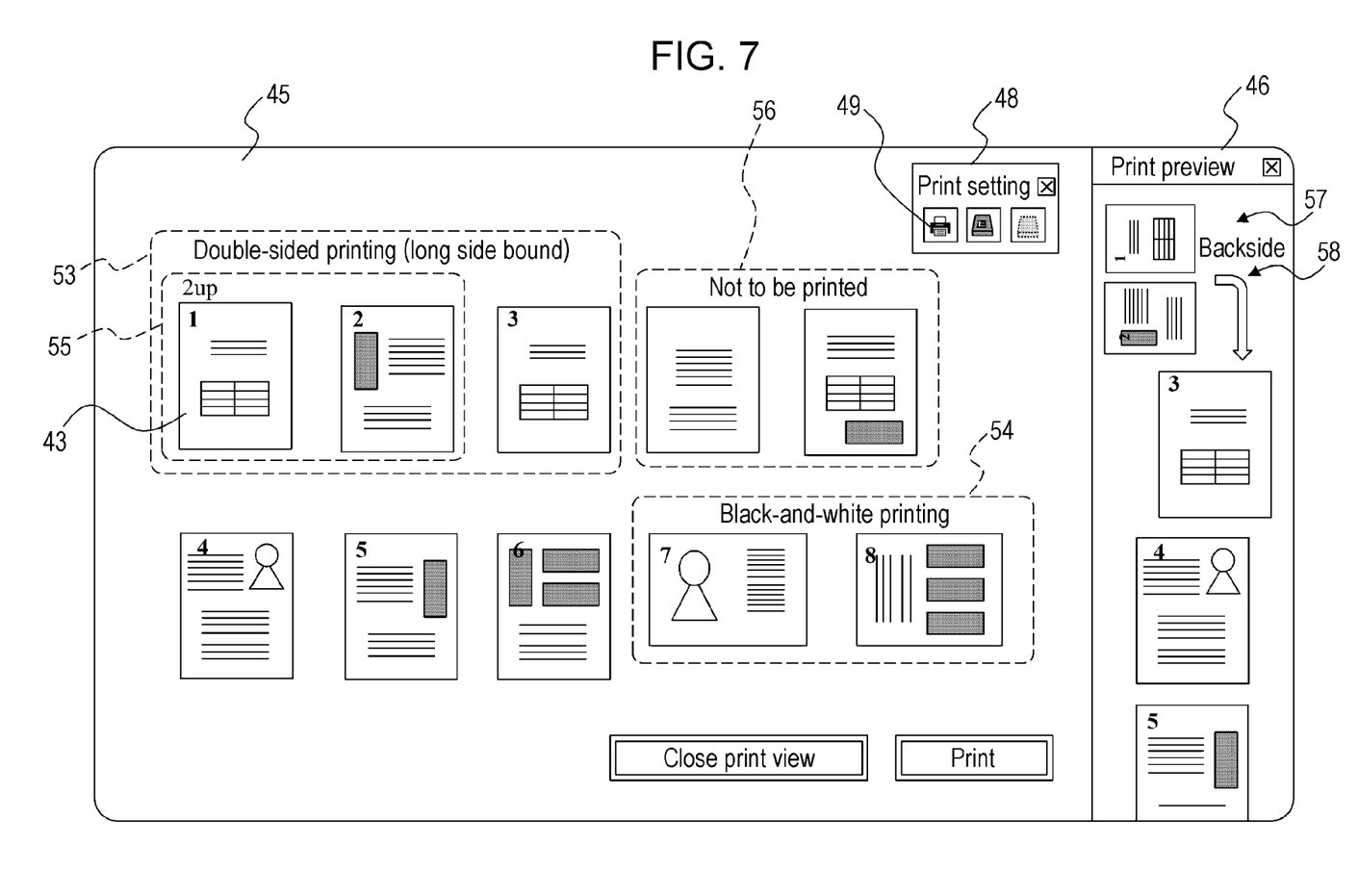
FIG. 7 is a diagram illustrating exemplary screen display of the state in which print attribute areas are set in FIG. 4.

FIG. 7 is a diagram illustrating exemplary screen display of the state in which print attributes are set for pages 43 by a user who performs setting of a print attribute area multiple times as described above. FIG. 7 illustrates a print attribute area 54 for black-and-white printing which is set through the user operation described above.

FIG. 7 illustrates an example in which a print attribute area 55 for 2up is set in the print attribute area 53 for double-sided printing (long side bound). "2up" indicates an attribute value for printing every two pages on one sheet in the collective print function for printing pages in one sheet collectively. A user selects, from the print setting tool bar 48, a print attribute 49 of collective print function, to which the attribute value of 2up is set as a print attribute of collective printing. Then, the user performs a mouse operation to enclose the pages, whose print page numbers are 1 to 2, in the print attribute area 53. The print attribute area setting unit 11 sets the print attribute area 55 for 2up in accordance with the user operation. The display controller 22 displays the print attribute area 55, which has been set, on the screen. The file management unit 10 further sets the print attribute of 2up for the pages 43, whose print page numbers are 1 to 2 and for which the print attribute of double-sided printing (long side bound) has been set.

The print controller 30 updates the print image, which is displayed on the print preview screen 46, in response to setting of the print attribute. According to the setting example of print attributes described above, print attributes have been set as follows: the pages, whose print page numbers are 1 and 2, are printed in 2up; the pages, whose print page numbers are 1 and 2, are double-sided printed with the page whose print page number is 3. According to this, the print controller 30 displays, on the print preview screen 46, the pages, whose print page numbers are 1 and 2, in a display form 57 in which printing the pages in 2up is recognizable intuitively, and displays the page, whose print page number is 3, in a display form 58 in which printing the page on the backside is recognizable intuitively.

As described above, in the present exemplary embodiment, print attribute areas are set in a so-called nesting state, enabling multiple print attributes to be set for a page. FIG. 7 illustrates the display example in which print attribute areas are set in a nesting state, that is, the print attribute area 55 for a print attribute (2up) is set so as to be included completely in the print attribute area 53 for a different print attribute (double-sided printing (long side bound)). However, complete inclusion is not necessary. For example, the print attribute area setting unit 11 makes a setting so that a print attribute area (referred to as a "first area") for a print attribute (referred to as a "first print attribute") overlaps a print attribute area (referred to as a "second area") for a different print attribute (referred to as a "second print attribute") at least partially. At that time, the display controller 22 performs display so that the first area overlaps the second area. Thus, the first print attribute is set for pages, which are in a part of the first area which is not the overlapping part between the first area and the second area. The second print attribute is set for pages, which are in a part of the second area which is not the overlapping part between the first area and the second area. Both the first print attribute and the second print attribute are set for pages which are in a print attribute area (referred to as a "third area") in which the first area overlaps the second area.

As illustrated in FIG. 7, a print attribute area 56 for "Not to be printed" may be set. While an icon for "Not to be printed" is displayed in the print setting tool bar 48, a user selects the icon, and then specifies an area in a similar way described above. In response to the user operation, the print attribute area setting unit 11 sets the print attribute area 56 for "Not to be printed". The display controller 22 displays the print attribute area 56, which has been set, on the screen. The pages 43 included in the print attribute area 56 are not the targets of printing as indicated by the name of the print attribute. Therefore, when the pages 43, whose print page numbers are 4 and 5, are set as not being targets of printing in accordance with the setting of the print attribute of "Not to be printed", the file management unit 10 removes the print page numbers which have been attached to the pages 43, and renumbers the subsequent pages, whose print page numbers are 6 to 10, to the print page numbers of 4 to 8.

In accordance with setting of the print attribute, the print controller 30 updates the print image displayed in the print preview screen 46. That is, in FIG. 7, the pages in the print attribute area 56 for "Not to be printed" are removed from the print preview screen 46.

A print attribute, which is usually called a default or an initial setting, may be set implicitly (referred to as "default setting"). In contrast, a page, which is included in any print attribute area, corresponds to the case in which a print attribute is explicitly set through a user operation. In FIG. 7, the pages 43, whose print page numbers are 4 to 6, do not belong to any print attribute areas. This means that no print attributes are set by a user explicitly, and only the default settings are set as print attributes.

In the description above, print attribute areas are set on the print view screen 45 on which the pages stored in a folder are deployed for display. Thus, for each of the pages located in the print attribute areas which have been set, the print attribute of the corresponding print attribute area, in which the page is positioned, is set for the page. Accordingly, in the present exemplary embodiment, a user performs a given operation to move a page 43. For example, a drag-and-drop operation is performed on a certain page 43 so that the page is moved into a print attribute area for the print attribute which is to be set for the page 43. The unit which is moved is not necessarily a page 43, and a print attribute area may be moved so that the nesting state described above is formed. A move of a print attribute area causes the pages 43 in the moved print attribute area to be also moved. In response to a user's move operation of a page or a print attribute area, the display controller 22 displays the page or the print attribute area in the move destination (step 104). In response to the move of a page or a print attribute area, the file management unit 10 sets the print attribute of the print attribute area, to which the page(s) are moved, for the page(s) 43.

For example, a page 43 is moved into the overlapping part between the print attribute area 53 and the print attribute area 55 in FIG. 7, enabling all of the print attributes (in this example, two print attributes of the double-sided printing (long side bound) and 2up) to be set for the page 43.

When a user operation for moving a print attribute area into a different print attribute area, in other words, a user operation of causing print attribute areas to enter a nesting state, is performed, the file management unit 10 checks if the print attribute of the print attribute area is incompatible with the print attribute of the different print attribute area. The term, "incompatible", indicates, for example, the case in which, as in the relationship between the black-and-white printing and the color printing, print attributes which are not capable of being set for a page at the same time, that is, print attributes which are mutually exclusive, are set. In the present exemplary embodiment, the term, "incompatible", is used for settings which are mutually exclusive. When a user performs an operation which may cause an incompatible state, a mismatch addressing process is performed to eliminate the mismatch between print attributes.

Figure 8:
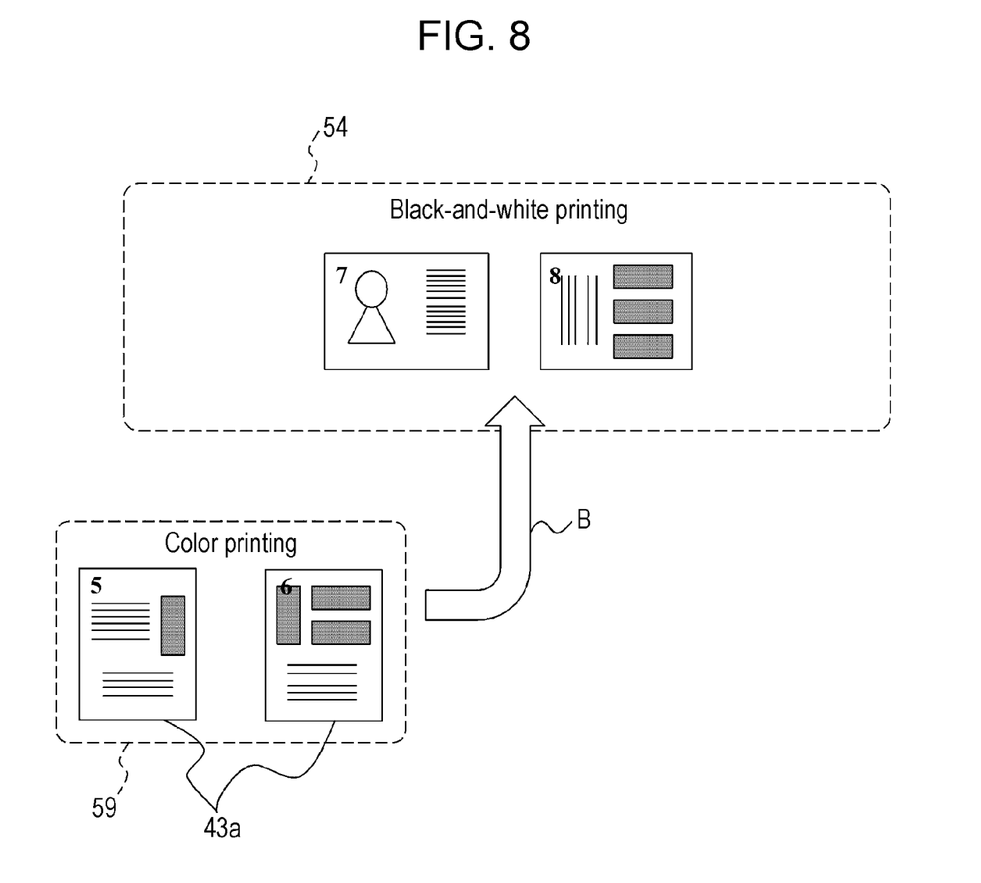
FIG. 8 is a diagram illustrating the case in which print attributes, which are set for pages, are incompatible with each other, in the present exemplary embodiment.

FIG. 8 illustrates an exemplary case in which a user performs a drag-and-drop operation to include a print attribute area 59 for the color print attribute in the print attribute area 54 for the black-and-white print attribute, as illustrated by using arrow B. As described above, the black-and-white print attribute is incompatible with the color print attribute. If an incompatible state does not occur (N in step 105), as described above, the file management unit 10 may set the print attribute of the move-destination print attribute area as the print attribute of a moved page(s) (step 106).

The file management unit 10 in the present exemplary embodiment sets, in advance, a method for addressing an incompatible state between print attributes. In the description in this specification, a print attribute area, for example, the print attribute area 54 in FIG. 8, to which the print attribute area 59, which is a different print attribute area, is moved, is referred to as a "move-destination print attribute area". A print attribute area, for example, the print attribute area 59 in FIG. 8, which is moved into the print attribute area 54, which is a different print attribute area, is referred to as a "move-target print attribute area".

Figure 9:
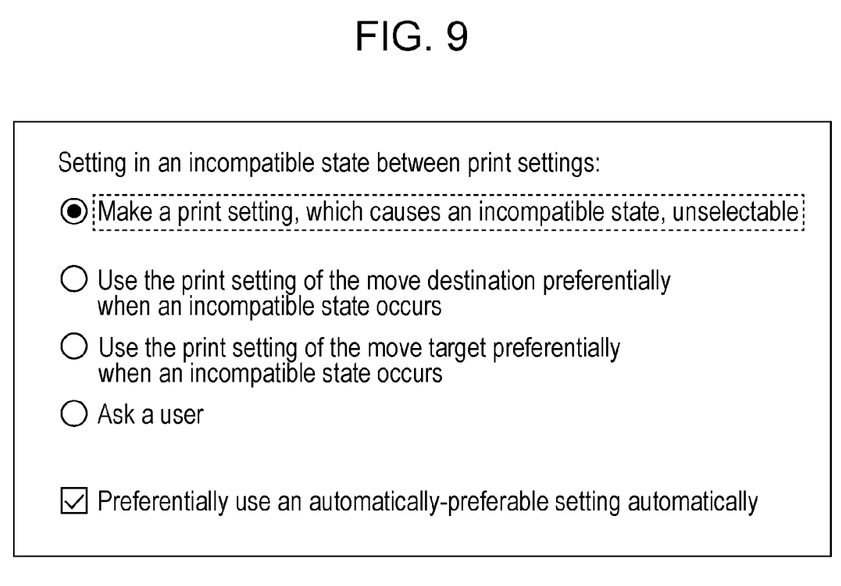
FIG. 9 is a diagram illustrating exemplary screen display for setting, in advance, a method for addressing an incompatible state, in the present exemplary embodiment.

FIG. 9 is a diagram illustrating exemplary screen display for setting, in advance, a method for addressing an incompatible state. In FIG. 9, assume the case in which a user selects "Make a print setting, which causes an incompatible state, unselectable." In this case, when the print attribute of the move-destination print attribute area is incompatible with the print attribute of the move-target print attribute area, the move of the move-target print attribute area into the move-destination print attribute area is rejected. For example, a drag-and-drop operation is performed to move the move-target print attribute area into the move-destination print attribute area. At that time, the moved mouse cursor is switched from the normal display component of arrow in FIG. 6, for example, to a display component indicating that no dropping is allowed. Thus, the user is notified that the move-target print attribute area is not allowed to be moved into the move-destination print attribute area.

Figure 10:
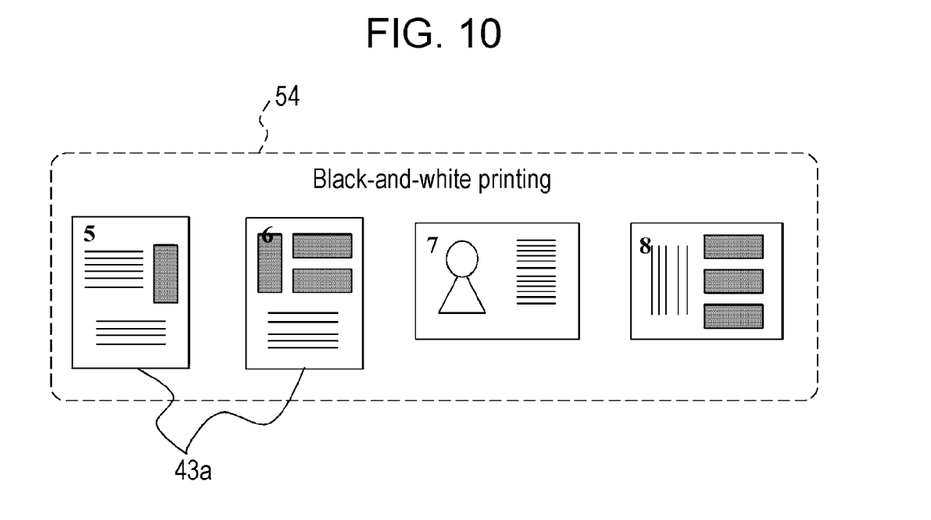
FIG. 10 is a diagram illustrating exemplary screen display performed when an incompatible state occurs and when the print attribute for a move-destination print attribute area is used preferentially, in the present exemplary embodiment.

In the case where a user selects "Use the print setting of the move destination preferentially when an incompatible state occurs," a move of the move-target print attribute area into the move-destination print attribute area is allowed, but the print attribute of the move-destination print attribute area is preferentially used. That is, in the mismatch addressing process, the move-target print attribute area is integrated with the move-destination print attribute area. Thus, only the move-destination print attribute area remains, and the print attribute which is set for the pages included in the move-target print attribute area is changed to the print attribute for the move-destination print attribute area. As illustrated in FIG. 8, when a user operation of moving the print attribute area 59 for the color print attribute into the print attribute area 54 for the black-and-white print attribute is performed, as illustrated in FIG. 10, the mismatch addressing processor 12 sets the black-and-white print attribute to the pages 43a which have been included in the print attribute area 59 for the color print attribute.

Figure 11:
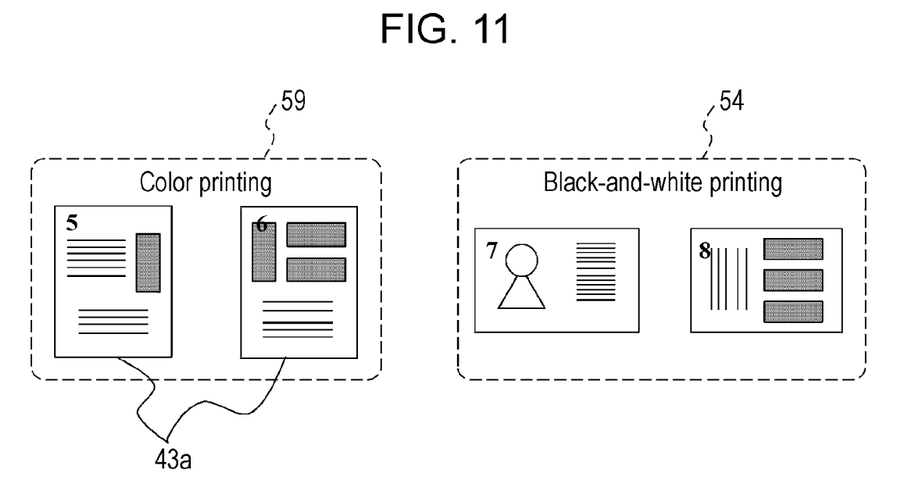
FIG. 11 is a diagram illustrating exemplary screen display performed when an incompatible state occurs and when the print attribute for a move-target print attribute area is used preferentially, in the present exemplary embodiment.

In the case where a user selects "Use the print setting of the move target preferentially when an incompatible state occurs," a move of the move-target print attribute area into the move-destination print attribute area is allowed, but the print attribute of the move-target print attribute area is preferentially used. That is, in the mismatch addressing process, the move-target print attribute area is not integrated with the move-destination print attribute area, and both the print attribute areas remain. As illustrated in FIG. 8, when a user operation of moving the print attribute area 59 for the color print attribute into the print attribute area 54 for the black-and-white print attribute is performed, as illustrated in FIG. 11, the file management unit 10 keeps, as it is, the setting of the color print attribute for the pages 43a which have been included in the print attribute area 59 for the color print attribute. In this case, the setting of the black-and-white print attribute for the pages, which have been included in the print attribute area 54, is also kept as it is. Since the print attribute area 54 does not include the pages 43a included in the print attribute area 59, the print attribute area setting unit 11 may change the size of the print attribute area 54 automatically or in accordance with a user operation so as to be decreased.

Figure 12:
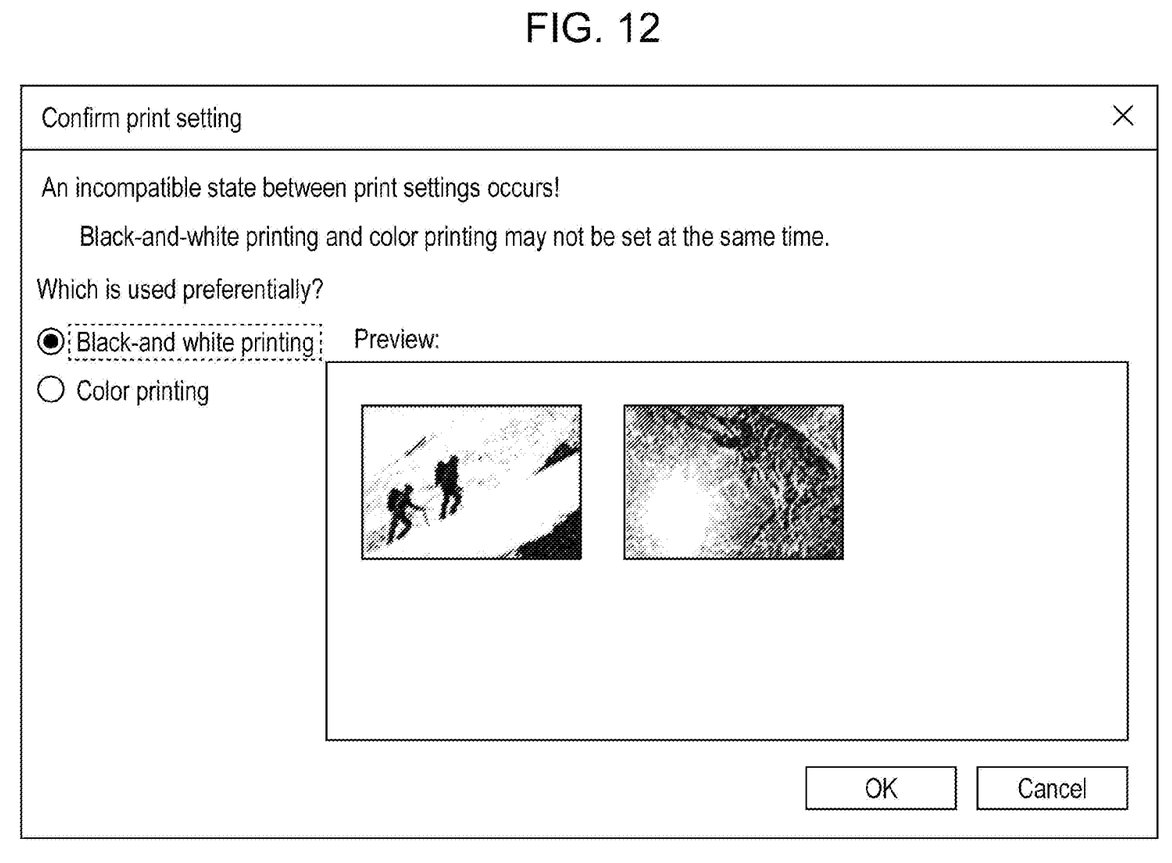
FIG. 12 is a diagram illustrating an exemplary inquiry screen displayed when an incompatible state occurs, in the present exemplary embodiment.

In the case where a user selects "Ask a user," the user is asked about which is to be used preferentially, the print attribute of the move-target print attribute area or that of the move-destination print attribute area, every time. FIG. 12 illustrates an exemplary inquiry screen to a user.

FIG. 12 illustrates an example of black-and-white printing and color printing as print attributes which cause an incompatible state. A user selects one of the print attributes on the screen.

When a user checks a check box, "Preferentially use an automatically-preferable setting automatically," the file management unit 10 by itself determines which is to be used preferentially, according to a given algorithm. However, when a radio button, "Make a print setting, which causes an incompatible state, unselectable," is selected, the display controller 22 displays the check box so as to be grayed out and not to be settable. When a radio button other than this is selected, change of a setting is allowed.

Figure 13:
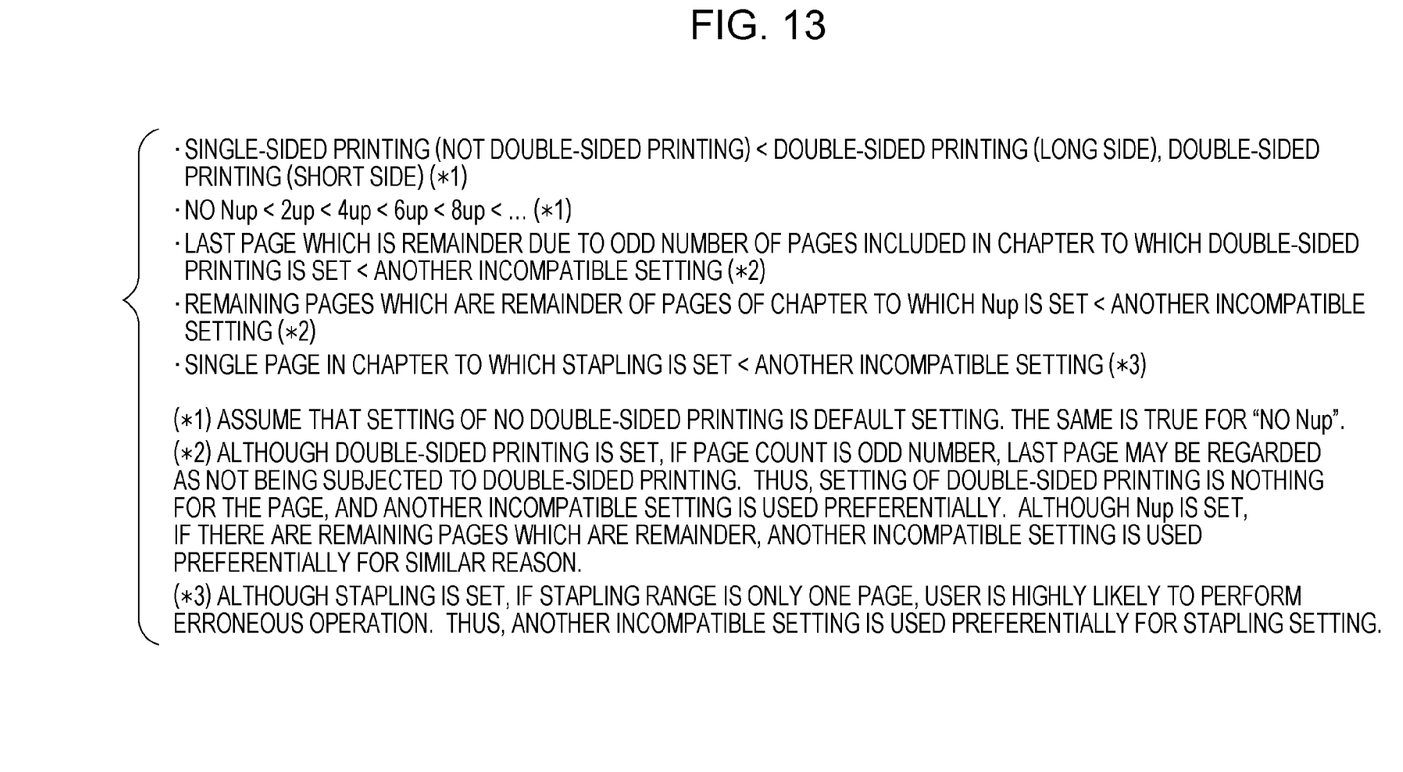
FIG. 13 is a diagram illustrating exemplary setting of print attributes with priorities, in the present exemplary embodiment.

Automatically-preferable settings are specifically illustrated in FIG. 13. FIG. 13 illustrates the degrees of priority by using inequality signs (<). That is, when a print attribute on the left side is incompatible with a print attribute on the right side, the print attribute on the right side is preferentially used. In the mismatch addressing process, when the order of priority is thus predetermined for possible print attribute settings, the print attribute setting of the pages included in the move-destination print attribute area or that of the pages included in the move-target print attribute area is changed according to the order of priority, causing a mismatch between print attributes to be eliminated.

If an incompatible state occurs between the print attribute of the move-destination print attribute area and that of the added move-target print attribute area (Y in step 105), the mismatch addressing processor 12 performs the mismatch addressing process according to the settings described above, and changes a print attribute as appropriate so as to eliminate the mismatching state between the print attributes (step 107).

When the user selects the "Close print view" button 50 or the "Print" button 51 on the print view screen 45 (Y in step 108), the process ends. If the user performs an operation other than this (N in step 108), the process proceeds to step 104 so that a new operation is received from the user.

Figure 14:
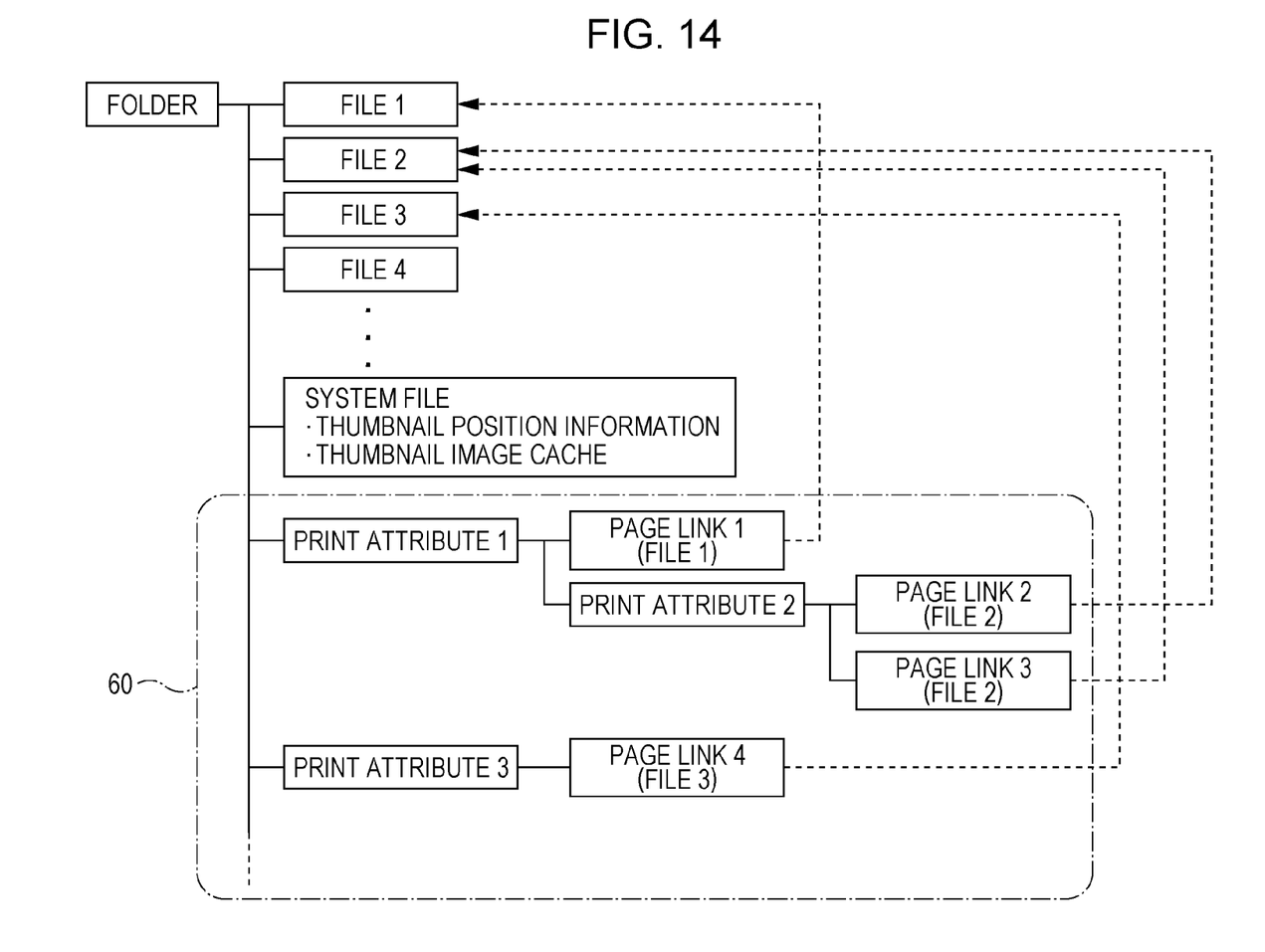
FIG. 14 is a diagram illustrating the data structure of management information in the present exemplary embodiment.

FIG. 14 is a diagram illustrating the data structure of print attribute management information 60 obtained when print attributes are set for pages 43 on the print view screen 45 as described above. The management information 60 describes the definition of the relationship between the print attributes for the print attribute areas which are set on the print view screen 45, the pages 43 to which the print attributes are set, and the files 41 and 42 including the pages 43. The management information 60 is used in a different information processing apparatus, enabling the above-described print attribute settings for the pages to be handed over even without setting of print attributes for the pages in the different information processing apparatus. In this case, the management information 60 may also have information indicating the dimensions and the like of a print attribute area.

In the description above, the case in which print attributes are set for pages is described as the print attribute setting process. Thus, reference to the management information 60 may cause the pages, which are stored in a folder, to be displayed by partitioning the pages in accordance with the print attributes. This enables a user to check print attributes which are set for each page on the screen in FIG. 7. For example, pages, to each of which two or more print attributes are set, are displayed in an overlapping part between the print attribute area 53 and the print attribute area 55, in other words, in a nesting part. Pages, which are not targets of printing, are displayed in the print attribute area 56 for "Not to be printed". The state in which pages are not printed may be checked also in the print preview screen 46 displayed on the same screen as the print view screen 45.

A user may change a print attribute, which is set for a page, also on a screen (for example, FIG. 7) on which print attributes, which are set for each page, are displayed. The change method may be the same as the print attribute setting process, and the page, which is to be changed, may be moved, through a drag-and-drop operation, into a print attribute area for the print attribute to which the page is to be set. In response to the user operation, the file management unit 10 changes the print attribute of the moved page to the print attribute for the move-destination print attribute area. A page, which is a target of printing, is moved into the print attribute area 56 for "Not to be printed". Thus, the page may be changed so as not to be printed. That is, in accordance with the user operation of changing a print attribute, the file management unit 10 changes a print attribute for the page. When a move of a page may cause an incompatible state, the mismatch addressing process is performed. In response to change of a print attribute, the print controller 30 updates display on the print preview screen 46 when necessary.

On the print preview screen 46, when a user selects a page, a page which is displayed on the print view screen 45 and which is selected on the print preview screen 46 may be displayed in a differentiated form so as to be differentiated from the other pages. Examples of the differentiated form include emphasis display of the page surrounded by using a color frame, and addition, to the page, of a text for providing a notification that the page is selected on the print preview screen 46.

A user checks the image of printed matter on the print preview screen 46. When there is a page whose print attribute is to be changed, the page is selected on the print preview screen 46. Thus, the user may grasp the page on the print view screen 45, and may change the print attribute of the page on the print view screen 45. Therefore, a user receives, in association with the page on the print view screen 45, notification of selection on the print preview screen 46. This facilitates changing the print attribute of the page, when the user checks the print preview screen 46. A print property may be displayed through a right-click on a page on the print preview screen 46, and the print attribute may be changed by using the print property.

In the present exemplary embodiment, as described above, a print attribute may be set on the print view screen for a page stored in a folder or the pages included in a file. Pages are displayed on the print view screen so as to be partitioned into print attribute areas for print attributes. Thus, association between the pages and the print attributes may be presented to a user so as to be grasped easily.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
display a first area and a second area, and
display a first page for setting a first print attribute in the first area and a second page for setting a second print attribute in the second area, wherein the first page and the second page form a document that is to be printed,
wherein the processor is further configured to set the second print attribute for the first page after the first page is moved from the first area into the second area, and
move a third page into a third area, the third area being an area where the first area and the second area overlap, and thus set the first print attribute and the second print attribute for the third page.

2. The information processing apparatus according to claim 1,
wherein the processor is configured to display, on a screen on which a third area is displayed, an image of printed matter obtained by printing the document.

3. The information processing apparatus according to claim 2,
wherein the processor is configured to display the image of the printed matter in an arrangement in order of printing.

4. The information processing apparatus according to claim 1,
wherein the processor is configured to display a third area constituted by a page that is not to be printed.

5. The information processing apparatus according to claim 1,
wherein the processor is configured to
display the first area and the second area in such a manner that the first area overlaps the second area at least partially, the first area corresponding to the first print attribute, the second area corresponding to the second print attribute.

6. The information processing apparatus according to claim 1,
wherein the processor is configured to, when a move operation of moving the second area corresponding to the second print attribute into the first area corresponding to the first print attribute is performed and when both the first print attribute and the second print attribute are not capable of being set for a third page, perform a mismatch addressing process for eliminating a mismatch between the print attributes.

7. The information processing apparatus according to claim 6,
wherein the mismatch addressing process involves rejection of the move operation.

8. The information processing apparatus according to claim 6,
wherein the mismatch addressing process involves change of the first print attribute to the second print attribute.

9. The information processing apparatus according to claim 6,
wherein the mismatch addressing process involves preserving both the first area corresponding to the first print attribute and the second area corresponding to the second print attribute without integration of the first area corresponding to the first print attribute with the second area corresponding to the second print attribute.

10. The information processing apparatus according to claim 6,
wherein, if order of priority is predetermined for possible print attribute settings, the mismatch addressing process sets the first print attribute or the second print attribute according to the order of priority.

11. The information processing apparatus according to claim 1,
wherein the page is displayed by using a reduced image indicating the page.

12. A non-transitory computer readable medium storing a program causing a computer to execute a process comprising:
displaying a first area and a second area;
displaying a first page for setting a first print attribute in the first area and a second page for setting a second print attribute in the second area, wherein the first page and the second page form a document that is to be printed;
setting the second print attribute for the first page after the first page is moved from the first area into the second area; and
moving a third page into a third area, the third area being an area where the first area and the second area overlap, and thus setting the first print attribute and the second print attribute for the third page.

13. An information processing apparatus comprising:
means for displaying a first area and a second area;
means for displaying a first page for setting a first print attribute in the first area and a second page for setting a second print attribute in the second area, wherein the first page and the second page form a document that is to be printed;
means for setting the second print attribute for the first page after the first page is moved from the first area into the second area; and
means for moving a third page into a third area, the third area being an area where the first area and the second area overlap, and thus setting the first print attribute and the second print attribute for the third page.

* * * * *